(12) United States Patent
Watanabe et al.

(10) Patent No.: US 10,469,693 B2
(45) Date of Patent: Nov. 5, 2019

(54) OPTICAL PRINT HEAD AND IMAGE FORMING DEVICE

(71) Applicant: KONICA MINOLTA, INC., Chiyoda-ku, Tokyo (JP)

(72) Inventors: Yoshikazu Watanabe, Toyohashi (JP); So Yano, Ibaraki (JP); Sotaro Yokota, Toyohashi (JP)

(73) Assignee: KONICA MINOLTA, INC., Tokyo (JP)

( * ) Notice: Subject to any disclaimer, the term of this patent is extended or adjusted under 35 U.S.C. 154(b) by 0 days.

(21) Appl. No.: 15/937,265

(22) Filed: Mar. 27, 2018

(65) Prior Publication Data

US 2018/0288266 A1 Oct. 4, 2018

(30) Foreign Application Priority Data

Mar. 29, 2017 (JP) .................................. 2017-064930

(51) Int. Cl.
*B41J 2/45* (2006.01)
*G02B 27/09* (2006.01)
(Continued)

(52) U.S. Cl.
CPC .............. *H04N 1/0306* (2013.01); *B41J 2/45* (2013.01); *G02B 27/0961* (2013.01);
(Continued)

(58) Field of Classification Search
CPC . B41J 2/45; G02B 27/0961; G03G 15/04054; G06K 15/1247;
(Continued)

(56) References Cited

U.S. PATENT DOCUMENTS 5,684,523 A * 11/1997 Satoh .......................... B41J 2/45
347/247
8,390,657 B2 * 3/2013 Nagumo .................... B41J 2/45
347/132
(Continued)

FOREIGN PATENT DOCUMENTS

JP 2006088510 A 4/2006
JP 2008055752 A 3/2008
JP 2008117882 A 5/2008

OTHER PUBLICATIONS

Extended European Search Report corresponding to Application No. 18164199.4-1209; dated Jul. 20, 2018.
(Continued)

*Primary Examiner* — Negussie Worku
(74) *Attorney, Agent, or Firm* — Cantor Colburn LLP

(57) ABSTRACT

An optical PH includes: a plurality of current-driven light emitting elements that are arranged in a line-shaped region; a controller that outputs a control voltage instructing an amount of a drive current to be supplied to each of the light emitting elements; and a plurality of drivers that correspond one-to-one with the light emitting elements, and each supply the drive current to a corresponding one of the light emitting elements, wherein the drivers each operate as one of: a high-voltage referring driver that supplies the drive current according to a voltage difference between the control voltage and a reference voltage higher than the control voltage; and a low-voltage referring driver that supplies the drive current according to a voltage difference between the control voltage and a reference voltage lower than the control voltage.

7 Claims, 11 Drawing Sheets

(51) Int. Cl.
  *G06K 15/12*   (2006.01)
  *H04N 1/03*    (2006.01)
  *G03G 15/04*   (2006.01)
  *G09G 3/3233*  (2016.01)
  *H04N 1/028*   (2006.01)

(52) U.S. Cl.
  CPC ..... *G03G 15/04054* (2013.01); *G09G 3/3233* (2013.01); *H04N 1/02845* (2013.01); *G06K 15/1247* (2013.01); *G09G 2300/0842* (2013.01); *G09G 2330/06* (2013.01)

(58) Field of Classification Search
  CPC ....... G09G 2300/0842; G09G 2330/06; G09G 3/3233; H04N 1/02845; H04N 1/0306
  USPC ........................................................ 358/1.14
  See application file for complete search history.

(56) References Cited

U.S. PATENT DOCUMENTS

| | | | |
|---|---|---|---|
| 9,358,807 B2* | 6/2016 | Yano | B41J 2/45 |
| 9,465,313 B2* | 10/2016 | Obayashi | G03G 15/04054 |
| 2004/0227527 A1* | 11/2004 | Bortesi | G01R 27/2605 |
| | | | 324/676 |
| 2006/0232574 A1* | 10/2006 | Miyazawa | G09G 3/3233 |
| | | | 345/204 |
| 2007/0128583 A1* | 6/2007 | Miyazawa | G09G 3/3233 |
| | | | 434/433 |
| 2008/0042942 A1 | 2/2008 | Takahashi | |
| 2008/0106509 A1 | 5/2008 | Fujikawa | |
| 2010/0302228 A1 | 12/2010 | Ishiguro et al. | |
| 2011/0193924 A1* | 8/2011 | Nagumo | B41J 2/45 |
| | | | 347/118 |
| 2012/0188221 A1 | 7/2012 | Izawa et al. | |
| 2015/0239258 A1* | 8/2015 | Yano | B41J 2/45 |
| | | | 347/247 |
| 2016/0018755 A1* | 1/2016 | Obayashi | G03G 15/04054 |
| | | | 347/118 |
| 2016/0255011 A1* | 9/2016 | Karino | H04L 69/40 |
| | | | 370/235 |
| 2016/0277916 A1* | 9/2016 | Morita | H04W 40/36 |
| 2017/0005937 A1* | 1/2017 | Morita | H04L 43/0864 |
| 2017/0164262 A1* | 6/2017 | Iihoshi | H04W 4/00 |
| 2017/0302558 A1* | 10/2017 | Watanabe | G06F 12/08 |
| 2018/0074432 A1* | 3/2018 | Yano | G03G 15/043 |
| 2018/0218244 A1* | 8/2018 | Yano | B41J 2/451 |
| 2018/0314184 A1* | 11/2018 | Watanabe | G03G 15/011 |

OTHER PUBLICATIONS

European Office Action corresponding to Application No. 18164199.4-1209; dated May 8, 2019.

* cited by examiner

Sample/hold signal

Voltage held in capacitor (no AC noise)

Light emitting amount of OLED 221

Voltage held in capacitor (after increase of control voltage Vdac)

Light emitting amount of OLED 221

Voltage held in capacitor (after decrease of control voltage Vdac)

Light emitting amount of OLED 221

Streak noise
(low spatial frequency)

Streak noise
(high spatial frequency)

Character mode (150 lpi, 8-dot cycle)

Photograph mode (190 lpi, 6-dot cycle)

OPTICAL PRINT HEAD AND IMAGE FORMING DEVICE

CROSS-REFERENCE TO RELATED APPLICATIONS

The present invention claims priority under 35 U.S.C. § 119 to Japanese patent Application No. 2017-064930, filed on Mar. 29, 2017, the entire disclosure of which are incorporated herein by reference.

BACKGROUND (1) Technological Field

The present invention relates to an optical print head (PH) and an image forming device.

(2) Description of the Related Art

According to recent image forming devices employing an electronic photography system, organic light emitting diode print heads (OLED-PHs) reducible in size and cost, which serve as optical PHs for exposing a photoreceptor to form electrostatic latent images, are under technical development. Manufacturing cost of OLED-PHs can be reduced by integrally forming OLEDs on a thin film transistor (TFT) substrate.

In an OLED-PH, OLEDs are arranged in a line-shaped region in a main scanning direction, and driving circuits are also arranged in a line-shaped region in the main scanning direction. The driving circuits are disposed close to the respective OLEDs, and control light emission amounts of the respective OLEDs. Meanwhile, a drive integrated circuit (IC) and a power source terminal are provided on one end of the OLED-PH in a longitudinal direction thereof. The drive IC receives image data from a main body of an image forming device, and inputs light amount control signals designating light emission amounts of the OLEDs to the respective driving circuits. The power source terminal is for power supply to the OLED-PH. Due to this configuration, signal wirings and source wirings from the drive IC and the power source terminal to the driving circuits are elongated.

Intersection between such wirings generates a parasitic capacitance at an intersection part therebetween. For example, intersection between a signal wiring and a source wiring causes a parasitic capacitance to act as a coupling capacitance. When a light amount control signal switches on and off on the signal wiring, a noise is superimposed on the source wiring. This varies a drive current for supply to the OLEDs and varies a light emission amount of the OLEDs accordingly. As a result, image quality might be deteriorated.

In response to such a problem, an art has been proposed for example of disposing an inverter on a signal wiring in units of blocks each including OLEDs, such that a logical level of a light amount control signal on the signal wiring is inverted at an intersection part between the signal wiring and a source wiring (see for example JP2008-117882). According to this art, noises superimposed on the source wirings after inversion cancel each other at intersection parts. This suppresses variation of the source voltage, thus suppressing image quality deterioration.

However, it is sometimes impossible to invert polarity of noises superimposed on wirings for mutual cancellation. For example, around a photosensitive drum for electrostatic latent image formation, a charging device and a developing device, which generate a high frequency noise, are provided in addition to an optical PH. Superimposed high frequency noises vary a light amount control signal and this causes a stripe density unevenness in an image. Unfortunately, because of impossibility of inversion of the polarity of high frequency noises, it is difficult to apply such a conventional art as above to suppress image deterioration.

SUMMARY

The present invention was made in view of such a problem as above, and aims to provide an optical PH and an image forming device capable of suppressing image quality deterioration due to a high frequency noise caused by a charging device and a developing device.

In order to achieve the above aim, an optical PH relating to at least one aspect of the present invention is an optical print head (PH) comprising: a plurality of current-driven light emitting elements that are arranged in a line-shaped region; a controller that outputs a control voltage instructing an amount of a drive current to be supplied to each of the light emitting elements; and a plurality of drivers that correspond one-to-one with the light emitting elements, and each supply the drive current to a corresponding one of the light emitting elements, wherein the drivers each operate as one of: a high-voltage referring driver that supplies the drive current according to a voltage difference between the control voltage and a reference voltage higher than the control voltage; and a low-voltage referring driver that supplies the drive current according to a voltage difference between the control voltage and a reference voltage lower than the control voltage.

BRIEF DESCRIPTION OF THE DRAWINGS

The advantages and features provided by one or more embodiments of the invention will become more fully understood from the detailed description given hereinafter and the appended drawings which are given by way of illustration only, and thus are not intended as a definition of the limits of the invention.

In the drawings.

DETAILED DESCRIPTION OF EMBODIMENTS

Hereinafter, one or more embodiments of the present invention will be described with reference to the drawings. However, the scope of the invention is not limited to the disclosed embodiments.

The following describes an optical PH and an image forming device relating to embodiments of the present invention, with reference to the drawings.

[1] First Embodiment (1-1) Configuration of Image Forming Device

The following describes the configuration of an image forming device relating to a first embodiment.

Figure 1:
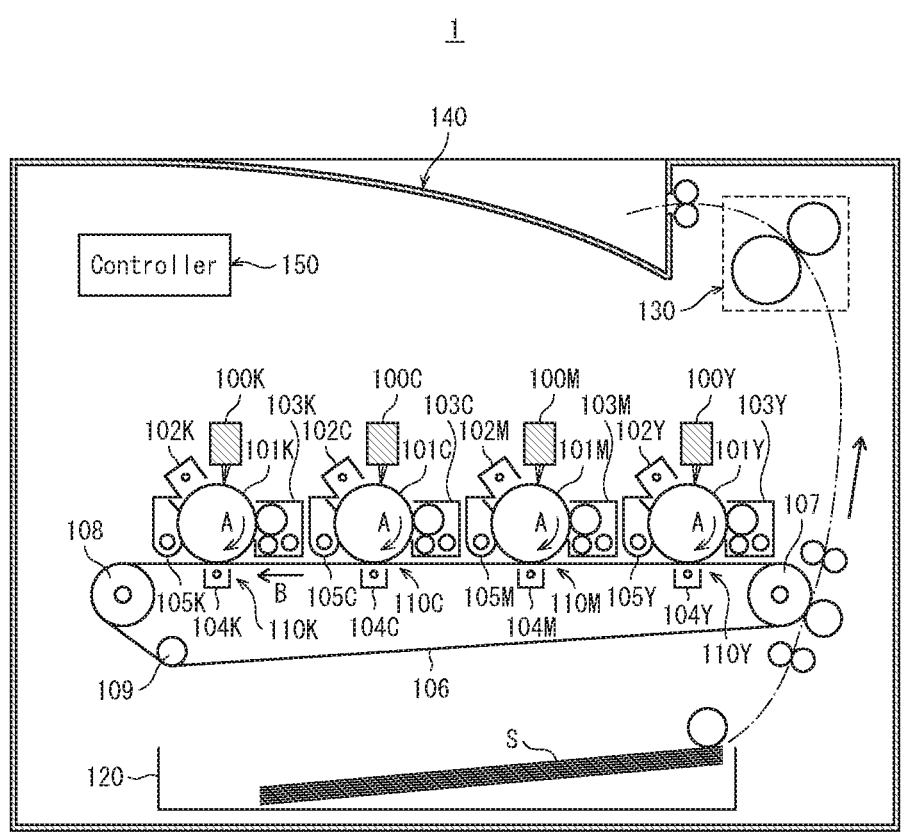
FIG. 1 shows major components of an image forming device relating to a first embodiment.

As shown in FIG. 1, an image forming device 1 is a so-called tandem type of color printer, and includes image forming stations 110Y, 110M, 110C, and 110K that respectively form yellow (Y), magenta (M), cyan (C), and black (K) toner images. The image forming stations 110Y, 110M, 110C, and 110K respectively include photosensitive drums 101Y, 101M, 101C, and 101K that rotate in a direction indicated by an arrow A. Around outer circumferential surfaces of the photosensitive drums 101Y, 101M, 101C, and 101K, the following devices are arranged by color: charging devices 102Y, 102M, 102C, and 102K, optical PHs 100Y, 100M, 100C, and 100K, developing devices 103Y, 103M, 103C, and 103K, primary transfer rollers 104Y, 104M, 104C, and 104K, and cleaning devices 105Y, 105M, 105C, and 105K, in the stated order.

The charging devices 102Y, 102M, 102C, and 102K respectively perform uniform charging on the outer circumferential surfaces of the photosensitive drums 101Y, 101M, 101C, and 101K. In this charging processing, the charging devices 102Y, 102M, 102C, and 102K perform electric discharge at high voltage and high frequency. This generates a high frequency noise (referred to hereinafter as AC noise).

The optical PHs 100Y, 100M, 100C, and 100K respectively expose the photosensitive drums 101Y, 101M, 101C, and 101K to form electrostatic latent images.

The developing devices 103Y, 103M, 103C, and 103K respectively supply Y, M, C, and K toners to develop the electrostatic latent images to form Y, M, C, and K toner images. In this developing processing, the developing devices 103Y, 103M, 103C, and 103K respectively use a developing bias at high voltage and high frequency to electrostatically absorb the toners onto the outer circumferential surfaces of the photosensitive drums 101Y, 101M, 101C, and 101K. This generates an AC noise.

The primary transfer rollers 104Y, 104M, 104C, and 104K respectively electrostatically transfer the toner images carried on the photosensitive drums 101Y, 101M, 101C, and 101K onto an intermediate transfer belt 106 (primary transfer). After the primary transfer, the cleaning devices 105Y, 105M, 105C, and 105K respectively remove electric charge and toner that remain on the outer circumferential surfaces of the photosensitive drums 101Y, 101M, 101C, and 101K.

The intermediate transfer belt 106 is an endless belt tensioned by a secondary transfer roller pair 107 and driven rollers 108 and 109, and runs in a direction indicated by an arrow B. The Y, M, C, and K toner images are primarily transferred in accordance with running of the intermediate transfer belt 106 so as to be overlapped one another. As a result, a color toner image is formed. The intermediate transfer belt 106 runs while carrying the color toner image, thereby to convey the color toner image to a secondary transfer nip of the secondary transfer roller pair 107.

A secondary transfer voltage is applied between two rollers constituting the secondary transfer roller pair 107. A recording sheet S is fed from a sheet feeding tray 120 in accordance with a conveyance timing of the color toner image by the intermediate transfer belt 106. The color toner image is electrostatically transferred onto the recording sheet S at the secondary transfer nip (secondary transfer).

The recording sheet S on which the color toner image is carried is conveyed to a fusing device 130, and is discharged onto a sheet discharge tray 140 after thermal fusing of the color toner image.

The image forming device 1 further includes the controller 150. Upon receiving a print job from an external device such as a personal computer (PC), the controller 150 controls operations of the image forming device 1 for image formation.

(1-2) Configuration of Optical PHs 100

The following describes the configuration of the optical PHs 100.

Figure 2:
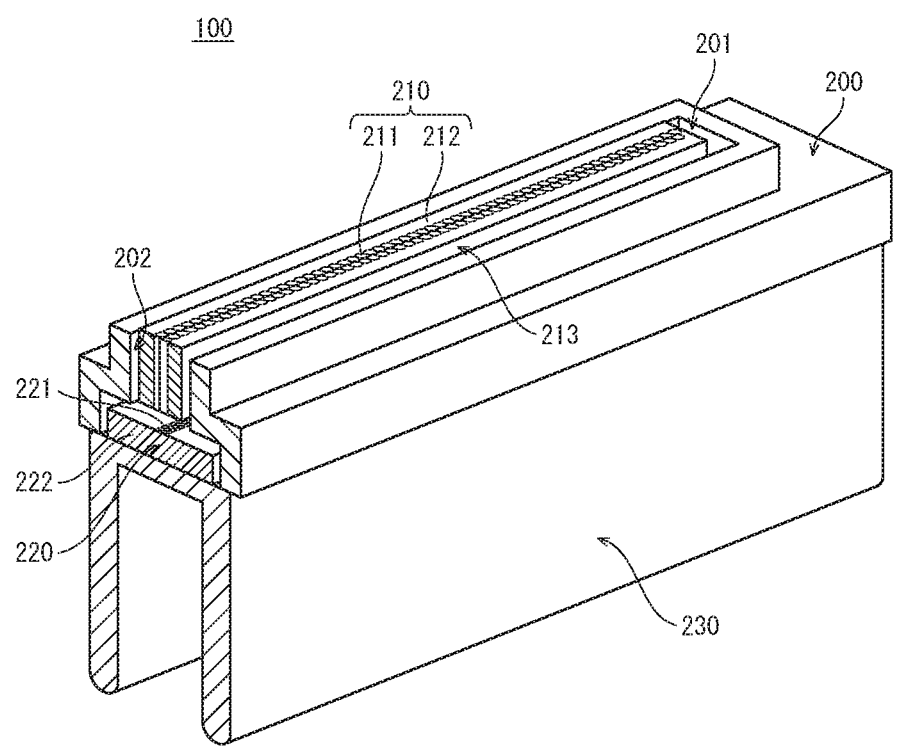
FIG. 2 is an external perspective view of major components of an optical PH 100.
Figure 2:
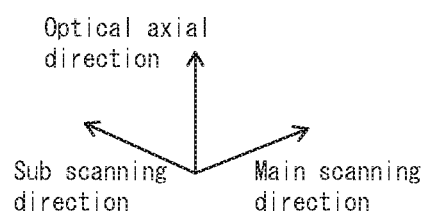

The optical PHs 100 are so-called OLED-PHs that each include, as shown in FIG. 2, an OLED panel 220, a lens holder 200, a lens array 210, and a reference holder 230.

The OLED panel 220 has a glass substrate 222 on which a TFT circuit (not illustrated) is formed. The TFT circuit has mounted thereon OLEDs 221 (15,000 pieces in the present embodiment) that are arranged in a line-shaped region. Note that the OLEDs 221 may be arranged in one or more staggered arrangements.

The lens array 210 is an elongated member and has a longitudinal direction that coincides with a main scanning direction. The lens array 210 has rod lenses 211 adhered thereto by a resin 212. The rod lenses 211 are arranged in two or more staggered arrangements in the longitudinal direction. The lens array 210 condenses light emitted from the OLEDs 221 onto the outer circumferential surface of the photosensitive drum 110. The lens array 210 may be a Selfoc lens array (SLA, where Selfoc is a registered trademark of Nippon Sheet Glass Co., Ltd).

The lens holder 200 is a resin member that is elongated in the main scanning direction and has a slit 201 penetrating in an optical axial direction. The slit 201 is also elongated in the main scanning direction. With the lens array 210 inserted in the slit 201, the lens holder 200 holds the lens array 210 by bonding side wall surfaces 213 of the lens array 210 and inner wall surfaces 202 of the slit 201 in a sub scanning direction.

The reference holder 230 is a sheet-metal member made of steel such as stainless use steel (SUS). The reference holder 230 has a support surface to which the lens holder 200 and the OLED panel 220 are fixed. This configuration defines a positional relation among the OLEDs 221, the rod lenses 211, and the photosensitive drum 110.

Note that FIG. 2 omits illustration of cables and so on for connecting the optical PH 100 with other devices such as the controller 150 included in the image forming device 1.

(1-3) OLED Panel 220

The following describes the configuration of the OLED panel 220.

Figure 3:
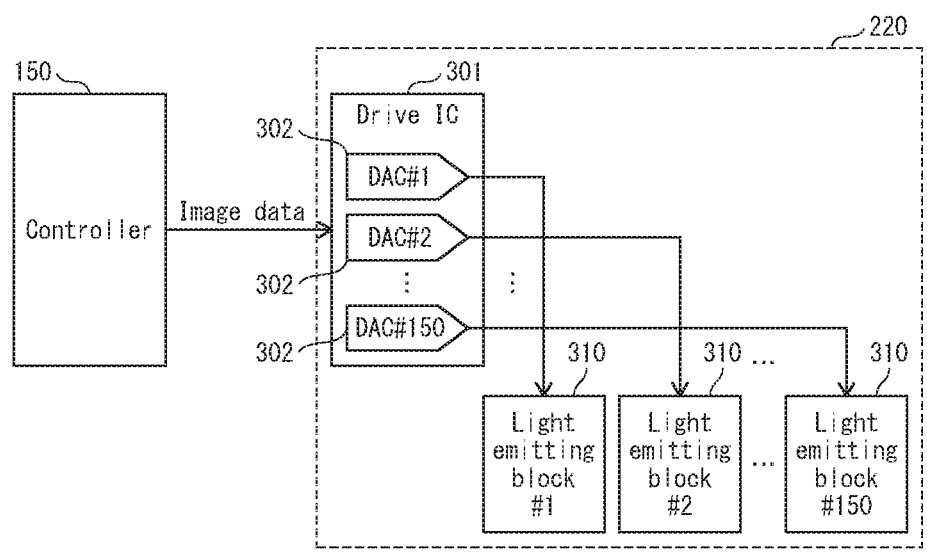
FIG. 3 is a block diagram showing major components of an OLED panel 220.

As shown in FIG. 3, the OLED panel 220 relating to the present embodiment includes a drive integrated circuit (IC)

301 and further includes 150 light emitting blocks 310. The drive IC 301 includes therein 150 digital-to-analog converters (DACs) 302 corresponding one-to-one to the light emitting blocks 310. The light emitting blocks 310 each have 100 OLEDs 221 allocated thereto.

Upon receiving image data pieces from the controller 150, the drive IC 301 distributes 100 image data pieces to each of the DACs 302 for each main scanning period. The DACs 302 each DA convert the distributed image data pieces to generate a control voltage Vdac, and input the generated control voltage Vdac to a corresponding one of the light emitting blocks 310.

Figure 4:
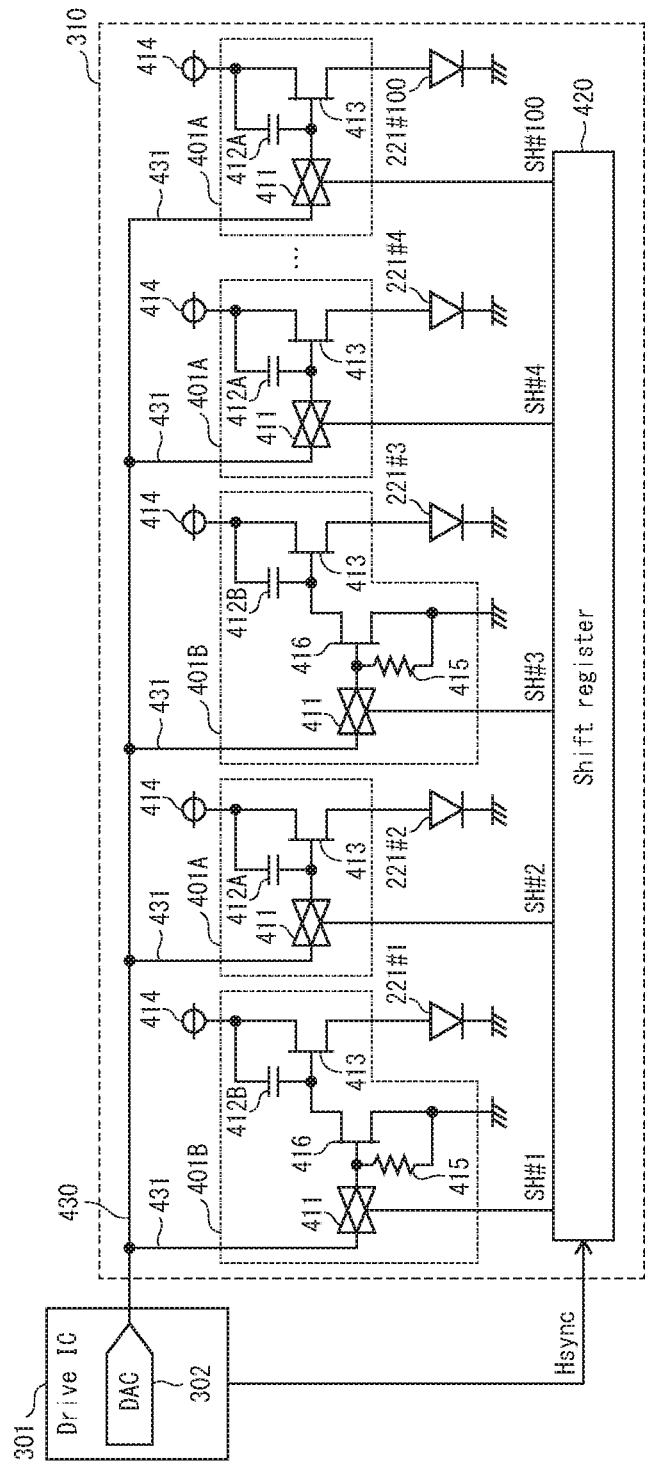
FIG. 4 is a circuit diagram showing major components of a light emitting block 310.

As shown in FIG. 4, the light emitting block 310 includes 100 OLEDs 221, drivers 401 provided for each of the OLEDs 221, and a shift register 420. The control voltage Vdac output from the DAC 302 reaches the light emitting block 310 via a control wiring 430, and then is input to one of the drivers 401 selected by the shift register 420 via a drawing wiring 431 drawn from the control wiring 430. The driver 401 supplies a drive current Id according to the control voltage Vdac to the OLED 221.

Of the drivers 401 which are arranged in a line-shaped region in the main scanning direction, the drivers 401 supplying a drive current Id to the respective even-numbered ones of the OLEDs 221 are referred to hereinafter as drivers 401A. Also, the drivers 401 supplying a drive current Id to the respective odd-numbered ones of the OLEDs 221 are referred to hereinafter as drivers 401B. The drivers 401A and 401B differ from each other in terms of circuit configuration.

The drivers 401A each include an analog switch 411, a capacitor 412A, and a driving transistor 413.

The analog switch 411 switches on and off electric connection between the drawing wiring 431 and one of terminals of the capacitor 412A according to a sample/hold signal SH output from the shift register 420. The other terminal of the capacitor 412A is connected to a reference source 414. Accordingly, while the analog switch 411 switches on the electric connection, a voltage difference between a reference voltage Vdd supplied by the reference source 414 and a control voltage Vdac is applied to the capacitor 412A. While the analog switch 411 switches off the electric connection, the capacitor 412A holds the voltage difference.

The one terminal and the other terminal of the capacitor 412A are respectively connected to a gate terminal and a source terminal of the driving transistor 413. Accordingly, when the voltage held in the capacitor 412A is applied as a gate-source voltage Vgs to the driving transistor 413, a drain current is supplied according to the held voltage as a drive current Id to the OLED 221.

The drivers 401B each include an analog switch 411, a capacitor 412B, and a driving transistor 413, and further include a resistance element 415 and a voltage inversion transistor 416.

The analog switch 411 switches on and off electric connection between the drawing wiring 431 and one of terminals of the resistance element 415 and electric connection between the drawing wiring 431 and a gate terminal of the voltage inversion transistor 416, according to a sample/hold signal SH output from the shift register 420. The resistance element 415 is provided for stabilizing a gate voltage of the voltage inversion transistor 416.

The voltage inversion transistor 416 has a drain terminal that is grounded and a source terminal that is connected to one of terminals of the capacitor 412B, and thus constitutes an inverter circuit. This configuration converts a reference potential of a control voltage Vdac from a ground voltage Vgnd to a reference voltage Vdd. Accordingly, a source voltage of the voltage inversion transistor 416 is output such that the voltage difference between the reference voltage Vdd and the source voltage is equivalent to the voltage difference between the control voltage Vdac and the ground voltage Vgnd.

While the analog switch 411 switches on the electric connections, a voltage difference between the source voltage of the voltage inversion transistor 416 and the reference voltage Vdd is applied to the capacitor 412B. While the analog switch 411 switches off the electric connections, the capacitor 412B holds the voltage difference.

The one terminal and the other terminal of the capacitor 412B are respectively connected to a gate terminal and a source terminal of the driving transistor 413. Accordingly, when the voltage held in the capacitor 412B is applied as a gate-source voltage Vgs to the driving transistor 413, a drain current is supplied according to the held voltage as a drive current Id to the OLED 221.

Figure 5:
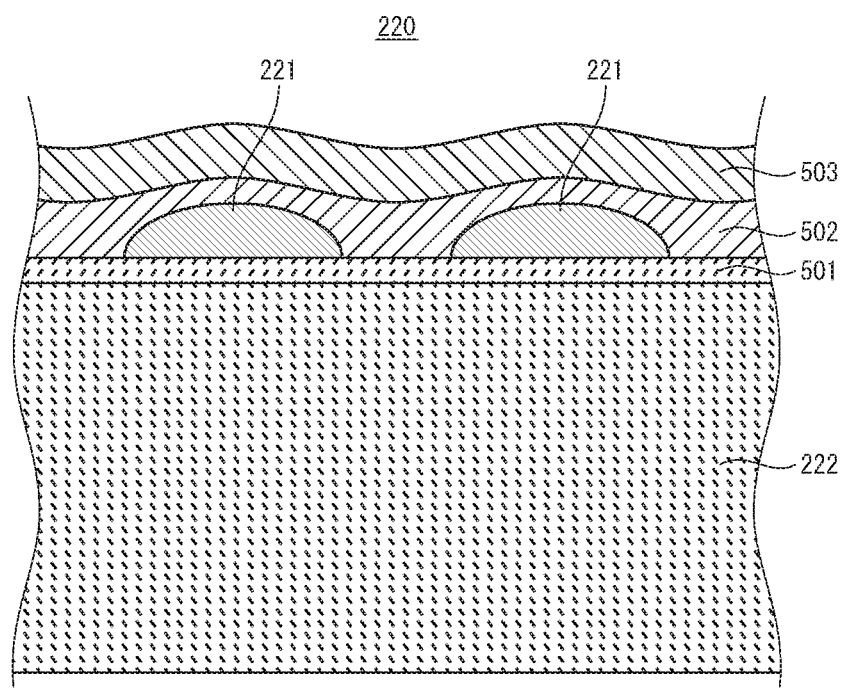
FIG. 5 is a cross-sectional view exemplifying a layer configuration of the OLED panel 220.

Note that all the OLEDs 221 included in the OLED panel 220 are grounded. As shown in FIG. 5, it is possible to manufacture the OLED panel 220 by subsequently forming, on the glass substrate 222, an indium titan oxide (ITO) wiring 501, the OLEDs 221, an insulating film 502, and an aluminum wiring 503 for grounding. This configuration requires fewer layers constituting the OLED panel 220 and thus reduces manufacturing costs.

Also, although the driving transistor 413 is a P-channel transistor in the above example, the present invention is of course not limited to this, and an N-channel transistor may be used instead of the P-channel transistor.

(1-4) Operations of OLED Panel 220

The following describes the operations of the OLED panel 220.

Figure 6A:
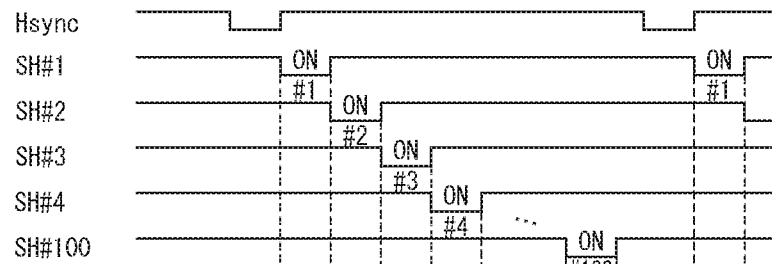
FIG. 6A is a timing chart explaining a sample/hold signal output by a shift register 420, FIG. 6B exemplifies a voltage held in each capacitor 412 with no AC noise, FIG. 6C exemplifies a light emission amount of each OLED 221 with no AC noise, FIG. 6D exemplifies a voltage held in each capacitor 412 after increase of a control voltage Vdac due to AC noise, FIG. 6E exemplifies a light emission amount of each OLED 221 after the increase of the control voltage Vdac due to the AC noise, FIG. 6F exemplifies a voltage held in each capacitor 412 after decrease of the control voltage Vdac due to AC noise, and FIG. 6G exemplifies a light emission amount of each OLED 221 after the decrease of the control voltage Vdac due to the AC noise.

In optical writing, first of all, the drive IC 301 inputs a horizontal synchronizing signal Hsync to the shift register 420. In synchronization with this horizontal synchronizing signal Hsync, the shift register 420 sequentially inputs a sample/hold signal SH to the drivers 401 (FIG. 6A).

The following describes a voltage difference applied to the capacitor 412 for the case where all the OLEDs 221 have a uniform target light amount and the DACs 302 output a uniform control voltage Vdac to all the drivers 401. Hereinafter, the voltage difference is referred to as capacitor voltage Vcap.

Figure 6B:
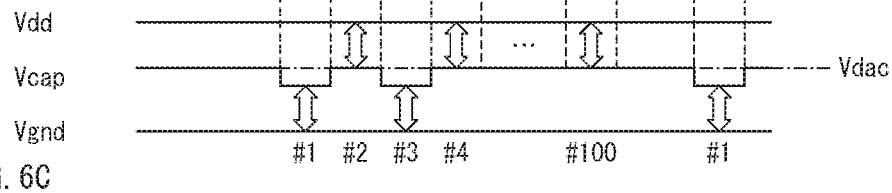
Figure 6C:
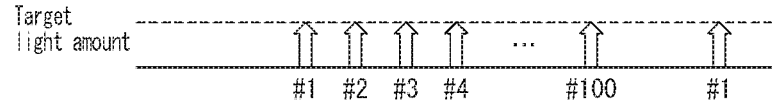

When no AC noise component is superimposed on the control voltage Vdac, a capacitor voltage Vcap applied to the capacitors 412A of the drivers 401A is equivalent to a capacitor voltage Vcap applied to the capacitors 412B of the drivers 401B as shown in FIG. 6B. Accordingly, a drive current Id supplied from the drivers 401A to the corresponding OLEDs 221 is equivalent to a drive current Id supplied from the drivers 401B to the corresponding OLEDs 221. Thus, all the OLEDs 221 light with the target light amount as shown in FIG. 6C.

Figure 6D:
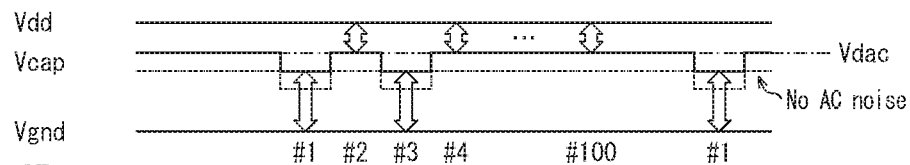
Figure 7:
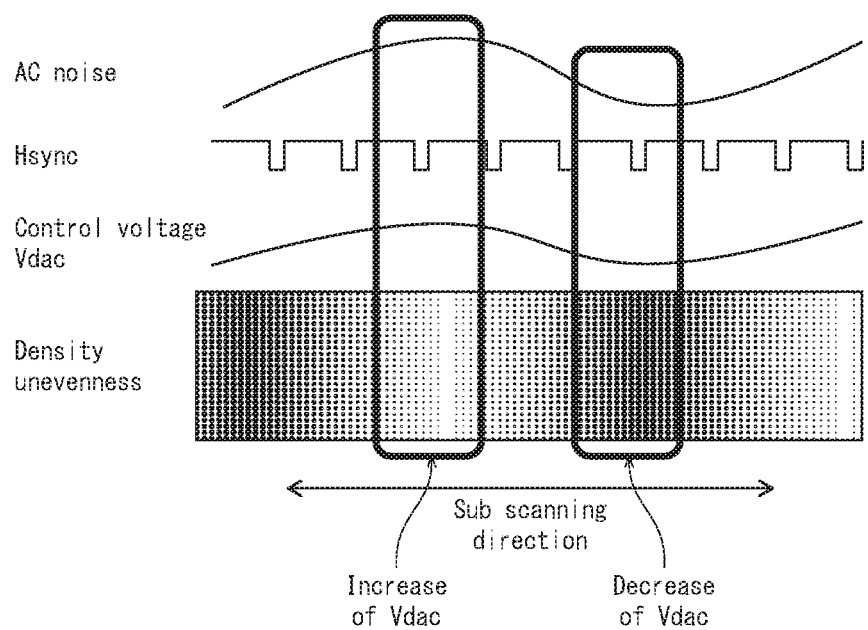
FIG. 7 explains a relation among AC noise, the control voltage Vdac, and an image.

As shown in FIG. 7, when an AC noise is superimposed on the control voltage Vdac, the control voltage Vdac increases and decreases according to an AC noise phase. In the case where the control voltage Vdac increases dues to of a superimposed noise component, a voltage difference between the control voltage Vdac and the reference voltage Vdd decreases, and thus the capacitor voltage Vcap applied to the capacitors 412A decreases as shown in FIG. 6D. Meanwhile, the voltage difference between the control voltage Vdac and the ground voltage Vgnd increases, and thus the capacitor voltage Vcap applied to the capacitors 412B increases.

Figure 6E:
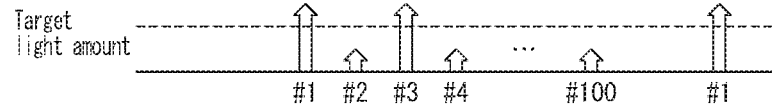

Therefore, as shown in FIG. 6E, the drive current Id supplied from the drivers 401A decreases and thus the light emission amount of the OLEDs 221 corresponding to the drivers 401A decreases, and the drive current Id supplied from the drivers 401B increases and thus the light emission amount of the OLEDs 221 corresponding to the drivers 401B increases.

Figure 8A:
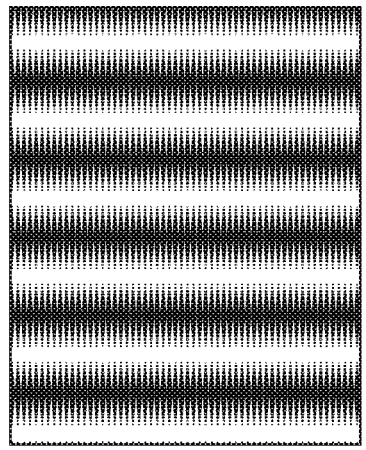
FIG. 8A exemplifies streak noise having a low spatial frequency, and FIG. 8B exemplifies streak noise having a high spatial frequency.
Figure 8B:
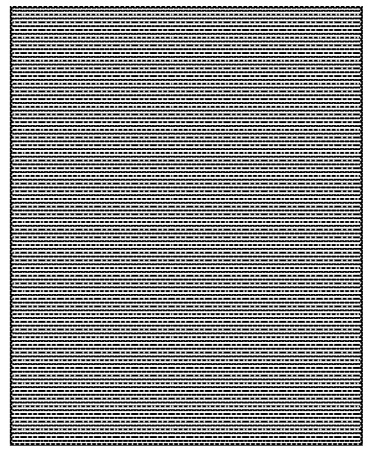

In this case, adjacent OLEDs 221 have substantially the equal absolute value of a deviation of the light emission amount from the target light amount, irrespective of increase or decrease of the light emission amount. Accordingly, the adjacent OLEDs 221 have an average light emission amount that is substantially equal to the target light amount. Further, density unevenness having a low spatial frequency is easy to visually recognize as shown in FIG. 8A. Meanwhile, density unevenness having a high spatial frequency is difficult to visually recognize as shown in FIG. 8B. Density unevenness caused by light amount unevenness between adjacent OLEDs 221 has a high spatial frequency, and this makes it difficult to visually recognize density unevenness resulting from an AC noise.

Figure 6F:
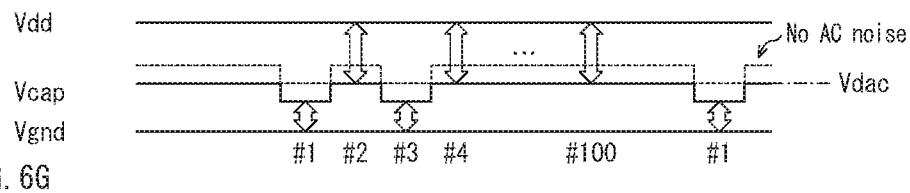

In the case where the control voltage Vdac decreases due to a superimposed noise component, the voltage difference between the control voltage Vdac and the reference voltage Vdd increases, and thus the capacitor voltage Vcap applied to the capacitors 412A increases as shown in FIG. 6F. Meanwhile, the voltage difference between the control voltage Vdac and the ground voltage Vgnd decreases, and thus the capacitor voltage Vcap applied to the capacitors 412B decreases.

Figure 6G:
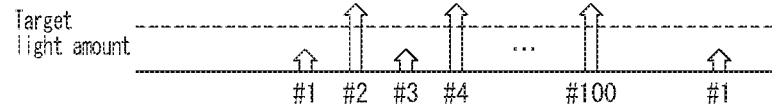

Therefore, as shown in FIG. 6G, the drive current Id supplied from the drivers 401A increases and thus the light emission amount of the OLEDs 221 increases, and the drive current Id supplied from the drivers 401B decreases and thus the light emission amount of the OLEDs 221 decreases. This also makes it difficult to visually recognize density unevenness, like in the above case where the control voltage Vdac increases due to a superimposed noise component.

[2] Second Embodiment

The following describes a second embodiment of the present invention. An image forming device relating to the present embodiment has substantially the same configuration as the image forming device 1 relating to the above first embodiment, and has drivers 401B with a different circuit configuration from that in the image forming device 1. The following description mainly focuses on the difference. Note that members and the like that are common among the embodiments and modifications have the common numeric references throughout the present description.

The following describes the configuration of an OLED panel 220 relating to the present embodiment.

Figure 9:
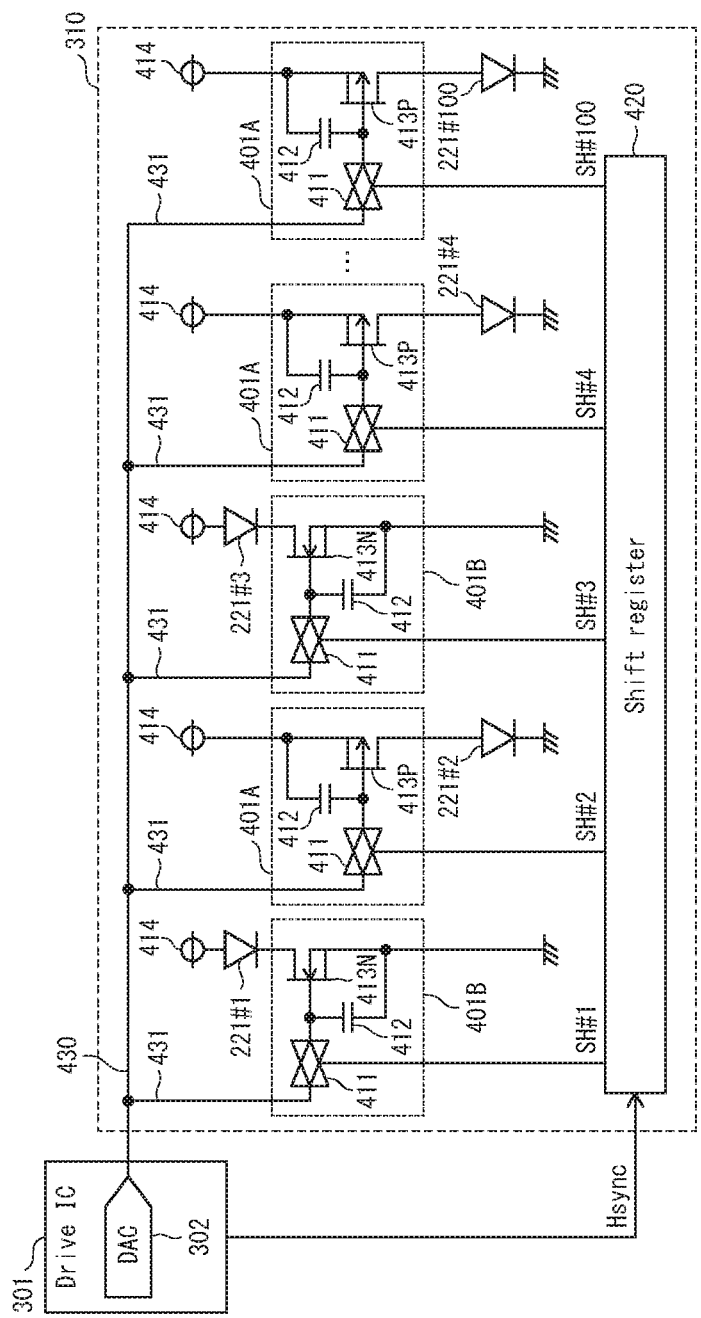
FIG. 9 is a circuit diagram showing major components of a light emitting blocks 310 relating to a second embodiment.

As shown in FIG. 9, the OLED panel 220 relating to the present embodiment has substantially the same circuit configuration as the OLED panel 220 relating to the above first embodiment, and differs only in terms of the circuit configuration of the drivers 401B from the OLED panel 220 relating to the first embodiment.

The drivers 401B relating to the present embodiment each include an analog switch 411, a capacitor 412, and a driving transistor 413N that is an N-channel transistor.

The analog switch 411 switches on and off electric connection between a drawing wiring 431 and one of terminals of the capacitor 412 according to a sample/hold signal SH output from a shift register 420. The other terminal of the capacitor 412 is grounded. Accordingly, while the analog switch 411 switches on the electric connection, a voltage difference between a control voltage Vdac and a ground voltage Vgnd is applied to the capacitor 412. While the analog switch 411 switches off the electric connection, the capacitor 412 holds the voltage difference.

The one terminal and the other terminal of the capacitor 412 are respectively connected to a gate terminal and a source terminal of the driving transistor 413N. A drain terminal of the driving transistor 413N is connected to a cathode terminal of the OLED 221. An anode terminal of the OLED 221 is connected to a reference source 414. Further, the source terminal of the driving transistor 413N is grounded.

Accordingly, when the voltage held in the capacitor 412 is applied as a gate-source voltage Vgs to the driving transistor 413N, a drain current is supplied according to the held voltage as a drive current Id to the OLEDs 221.

In this way, the drivers 401B relating to the present embodiment supply to the OLEDs 221 the driving current according to the voltage difference between the control voltage Vdac and the ground voltage Vgnd, like the drivers 401B relating to the above first embodiment. Therefore, according to the optical PH 100 relating to the present embodiment like the optical PH 100 relating to the above first embodiment, it is possible to make it difficult visually recognize density unevenness resulting from an AC noise.

Further, no inverter circuit is necessary in the present embodiment unlike in the above first embodiment. Therefore, it is possible to simplify the circuit configuration of the OLED panel 220, thereby realizing size reduction of the OLED panel 220.

[3] Third Embodiment

The following describes a third embodiment of the present invention.

An image forming device relating to the present embodiment has substantially the same configuration as the image forming device 1 relating to the above first embodiment, and has drivers 401 with a different circuit configuration from that in the image forming device 1. The following description mainly focuses on the difference.

Figure 10:
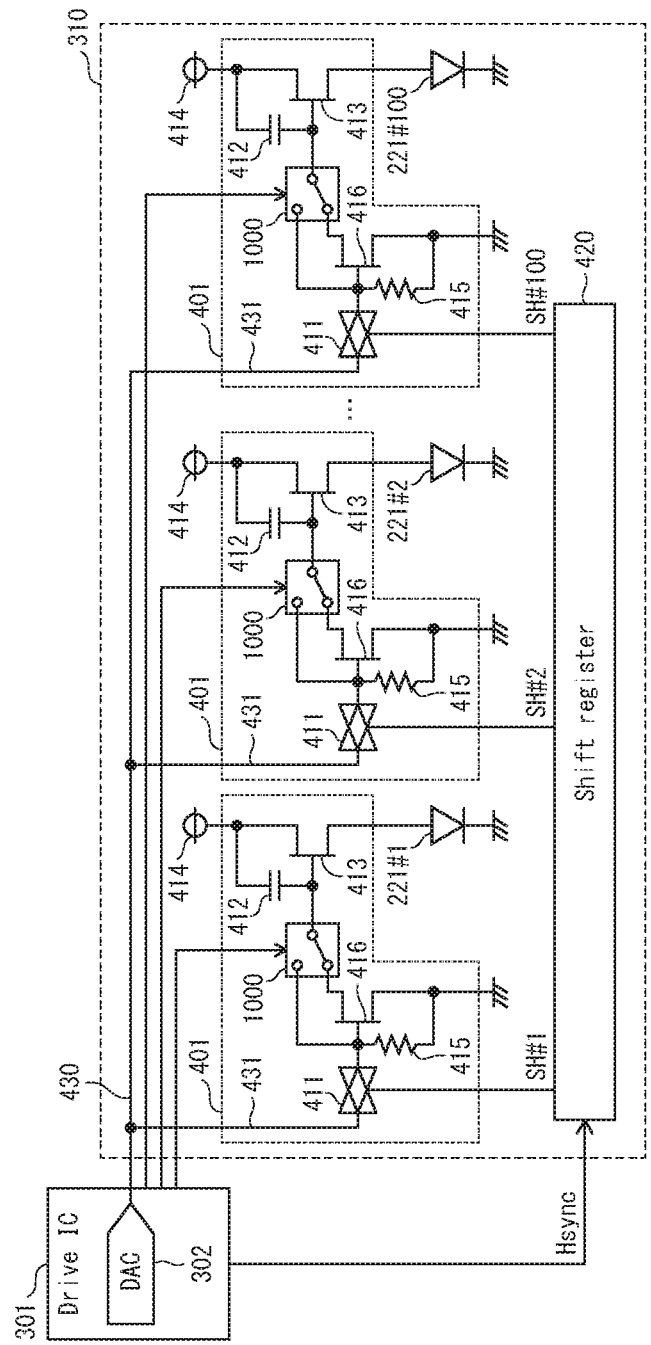
FIG. 10 is a circuit diagram showing major components of a light emitting blocks 310 relating to a third embodiment.

As shown in FIG. 10, the drivers 401 relating to the present embodiment each include a selection switch 1000. The selection switch 1000 selectively connects a gate terminal or a source terminal of a voltage inversion transistor 416 to a gate terminal of a driving transistor 413.

When the selection switch 1000 connects the gate terminal of the voltage inversion transistor 416, a voltage difference between a reference voltage Vdd and a control voltage Vdac is applied as a gate-source voltage Vgs to the driving transistor 413. In other words, the driver 401 operates as the driver 401A relating to the above first embodiment.

Meanwhile, when the selection switch 1000 connects the source terminal of the voltage inversion transistor 416, a voltage difference between a ground voltage Vgnd and the control voltage Vdac is supplied as a gate-source voltage Vgs to the driving transistor 413. In other words, the driver 401 operates as the driver 401B relating to the first embodiment.

According to the present embodiment, thus, it is possible to determine for each of the OLEDs 221 which one of the following two voltage differences is to be applied to the driving transistor 413: the voltage difference between the reference voltage Vdd and the control voltage Vdac and the voltage difference between the ground voltage Vgnd and the control voltage Vdac.

Figure 11A:
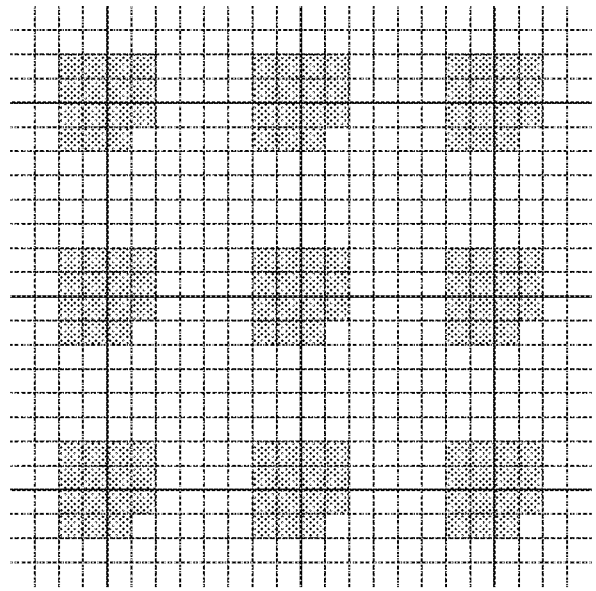
FIG. 11A and FIG. 11B respectively exemplify dot patterns for a character mode and a photograph mode as an image quality mode.
Figure 11B:
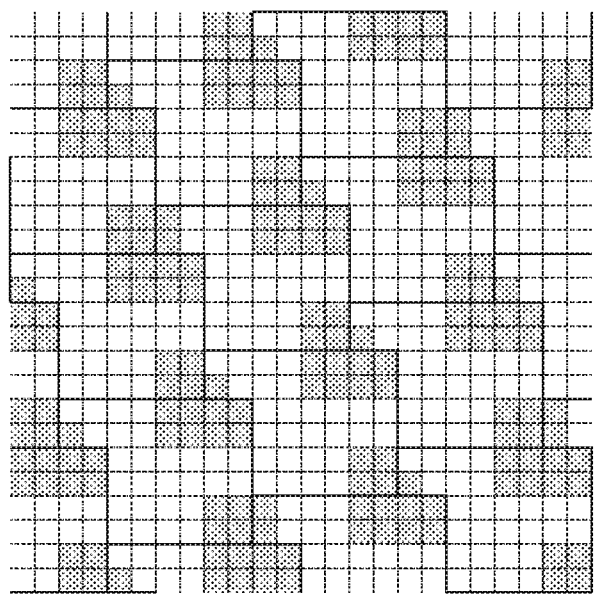

Further, a cycle of a dot pattern for tone reproduction differs depending on whether an image quality mode designated in a print job is a character mode (150 line per inch (lpi)) or a photograph mode (190 lpi). For example, the dot pattern in the character mode has an eight-dot cycle (FIG. 11A), and the dot pattern in the photograph mode has a six-dot cycle (FIG. 11B).

In the case where the cycle of the dot pattern does not coincide with a cycle of the connection status of the selection switch 1000 provided for each of the OLEDs 221, density unevenness in a moiré pattern might occur due to AC noise. Also, in the case where the cycle of the connection status of the selection switch 1000 is fixed to coincide with the cycle of the dot pattern of one of the image quality modes, density unevenness might occur in the other image quality mode which differs in terms of cycle of dot pattern from the one image quality mode.

In response to this problem, it is possible to suppress density unevenness in either of the image quality modes by switching the connection status of the selection switch 1000 according to each of the image quality modes such that the connection status coincides with the cycle of the dot pattern of the image quality mode.

Also in this case, when the cycle of the dot pattern differs for each main scanning line, it is possible to further suppress the density unevenness by switching the connection status of the selection switch 1000 for each main scanning line.

[4] Modifications

Above, the present invention is described based on the embodiments, but the present invention is of course not limited to the embodiment above, and the following modifications of the present invention may be implemented.

(4-1) In the above embodiments, the reference for the control voltage differs between the OLEDs 221 adjacent in the main scanning direction. However, the present invention is of course not limited to this. Alternatively, the OLEDs 221 for example may be grouped in order in the main scanning direction such that each two groups adjacent in the main scanning direction differ from each other in reference voltage. In this case, the number of OLEDs 221 belonging to each group may be constant or differ for each main scanning position. Note that the smaller the number of OLEDs 221 belonging to one group is, the more difficult visual recognition of density unevenness resulting from an AC noise is.

(4-2) In the above embodiments, OLEDs are used as light emitting elements. However, the present invention is of course not limited to this. It is possible to exhibit the same effect even by applying the present invention to an optical PH including light emitting elements other than OLEDs.

(4-3) In the above embodiments, the OLEDs 221 each expose a different pixel. However, the present invention is of course not limited to this. It is possible to exhibit the same effect even by applying the present invention to a multiple exposure system according to which the OLEDs 221 expose one pixel. In this case, it is preferable to switch the reference for the control voltage for each of pixels adjacent in the main scanning direction.

(4-4) In the above embodiments, the reference voltage Vdd and the ground voltage Vgnd are used as the reference for the control voltage. However, the present invention is of course not limited to this. Other voltage may be employed as the reference instead of the ground voltage Vgnd. Note that it is desirable that one of two voltages for the control voltage should be higher than the control voltage at which the OLEDs 221 are turned on, and the other voltage should be lower than the control voltage at which the OLEDs 221 are turned on.

Further, it is preferable that in the case where no AC noise component is superimposed on the control voltage, a voltage difference between the one voltage and the control voltage should be equal to a voltage difference between the other voltage and the control voltage.

(4-5) In the above embodiments, the image forming device 1 is described as a tandem-type color printer. However, the present invention is of course not limited to this, and may be applied to a color printer other than a tandem type or a monochrome printer. Further, the effects of the present invention can be achieved when applied to a copying device incorporating a scanner, a facsimile device incorporating a communication function, or a multi-function peripheral (MFP) incorporating several such functions.

[5] Outline

To sum up, an optical PH according to at least one embodiment of the present invention is an optical print head (PH) comprising: a plurality of current-driven light emitting elements that are arranged in a line-shaped region; a controller that outputs a control voltage instructing an amount of a drive current to be supplied to each of the light emitting elements; and a plurality of drivers that correspond one-to-one with the light emitting elements, and each supply the drive current to a corresponding one of the light emitting elements, wherein the drivers each operate as one of: a high-voltage referring driver that supplies the drive current according to a voltage difference between the control voltage and a reference voltage higher than the control voltage; and a low-voltage referring driver that supplies the drive current according to a voltage difference between the control voltage and a reference voltage lower than the control voltage. According to this configuration, the drivers each refer to the reference voltage that is higher or lower than the control voltage, and thus the increase and decrease in light amount are different for each light emitting element. Therefore, it is possible to make it difficult to visually recognize light amount unevenness resulting from an AC noise and then toner density unevenness in image formation.

In this case, the light emitting elements should be desirably arranged such that light emitting elements supplied with the drive current from the respective high-voltage referring drivers and light emitting elements supplied with the drive current from the respective low-voltage referring drivers alternate in an arrangement direction of the light emitting elements.

Also, the drivers each may have a transistor that supplies the drive current according to the voltage difference, and the transistor may be a P-channel transistor in each of the high-voltage referring drivers and may be an N-channel transistor in each of the low-voltage referring drivers.

Also, the drivers each should desirably include a switch that switches whether the driver is to operate as the high-voltage referring driver or as the low-voltage referring driver.

Also, the reference voltage lower than the control voltage may be a ground voltage.

Also, the above optical PH may be included in an image forming device.

An image forming device according to at least one embodiment of the present invention is an image forming device that performs image formation according to a dot pattern corresponding to a resolution of an image to be formed, the image forming device comprising: an optical print head (PH) comprising: a plurality of current-driven light emitting elements that are arranged in a line-shaped region; a controller that outputs a control voltage instructing an amount of a drive current to be supplied to each of the light emitting elements; and a plurality of drivers that correspond one-to-one with the light emitting elements, and each supply the drive current to a corresponding one of the light emitting elements, wherein the drivers each operate as one of: a high-voltage referring driver that supplies the drive current according to a voltage difference between the control voltage and a reference voltage higher than the control voltage; and a low-voltage referring driver that supplies the drive current according to a voltage difference between the control voltage and a reference voltage lower than the control voltage, and the image forming device further comprises a control unit that controls the switch according to the resolution.

In this case, the control unit should desirably control an arrangement cycle of the light emitting elements according to the resolution, the arrangement cycle being a cycle in which light emitting elements supplied with the respective high-voltage referring drivers and light emitting elements supplied with the respective low-voltage referring drivers are alternate in an arrangement direction of the light emitting elements, and the arrangement cycle should desirably decrease as the resolution increases.

Although embodiments of the present invention have been described and illustrated in detail, the disclosed embodiments are made for purposes of illustration and example only and not limitation. The scope of the present invention should be interpreted by terms of the appended claims.

What is claimed is:

1. An optical print head (PH) comprising:
   a plurality of current-driven light emitting elements that are arranged in a line-shaped region;
   a controller that outputs a control voltage instructing an amount of a drive current to be supplied to each of the light emitting elements; and
   a plurality of drivers that correspond one-to-one with the light emitting elements, and each supply the drive current to a corresponding one of the light emitting elements, wherein
   the drivers each operate as one of:
   a high-voltage referring driver that supplies the drive current according to a voltage difference between the control voltage and a reference voltage higher than the control voltage; and
   a low-voltage referring driver that supplies the drive current according to a voltage difference between the control voltage and a reference voltage lower than the control voltage;
   wherein the light emitting elements are arranged such that light emitting elements supplied with the drive current from the respective high-voltage referring drivers and light emitting elements supplied with the drive current from the respective low-voltage referring drivers alternate in an arrangement direction of the light emitting elements.

2. The optical PH of claim 1, wherein
   the drivers each have a transistor that supplies the drive current according to the voltage difference, and
   the transistor is a P-channel transistor in each of the high-voltage referring drivers and is an N-channel transistor in each of the low-voltage referring drivers.

3. The optical PH of claim 1, wherein
   the drivers each include a switch that switches whether the driver is to operate as the high-voltage referring driver or as the low-voltage referring driver.

4. The optical PH of claim 1, wherein
   the reference voltage lower than the control voltage is a ground voltage.

5. An image forming device including an optical print head (PH), the optical PH comprising:
   a plurality of current-driven light emitting elements that are arranged in a line-shaped region;
   a controller that outputs a control voltage instructing an amount of a drive current to be supplied to each of the light emitting elements; and
   a plurality of drivers that correspond one-to-one with the light emitting elements, and each supply the drive current to a corresponding one of the light emitting elements, wherein
   the drivers each operate as one of:
   a high-voltage referring driver that supplies the drive current according to a voltage difference between the control voltage and a reference voltage higher than the control voltage; and
   a low-voltage referring driver that supplies the drive current according to a voltage difference between the control voltage and a reference voltage lower than the control voltage;
   wherein the light emitting elements are arranged such that light emitting elements supplied with the drive current from the respective high-voltage referring drivers and light emitting elements supplied with the drive current from the respective low-voltage referring drivers alternate in an arrangement direction of the light emitting elements.

6. An image forming device that performs image formation according to a dot pattern corresponding to a resolution of an image to be formed, the image forming device comprising:
   an optical print head (PH) comprising:
   a plurality of current-driven light emitting elements that are arranged in a line-shaped region;
   a controller that outputs a control voltage instructing an amount of a drive current to be supplied to each of the light emitting elements; and
   a plurality of drivers that correspond one-to-one with the light emitting elements, and each supply the drive current to a corresponding one of the light emitting elements, wherein
   the drivers each operate as one of:
   a high-voltage referring driver that supplies the drive current according to a voltage difference between the control voltage and a reference voltage higher than the control voltage; and
   a low-voltage referring driver that supplies the drive current according to a voltage difference between the control voltage and a reference voltage lower than the control voltage, and
   the image forming device further comprises
   a control unit that controls the switch according to the resolution;
   wherein the light emitting elements are arranged such that light emitting elements supplied with the drive current from the respective high-voltage referring drivers and light emitting elements supplied with the drive current from the respective low-voltage referring drivers alternate in an arrangement direction of the light emitting elements.

7. The image forming device of claim 6, wherein
   the control unit controls an arrangement cycle of the light emitting elements according to the resolution, the arrangement cycle being a cycle in which light emitting elements supplied with the respective high-voltage referring drivers and light emitting elements supplied with the respective low-voltage referring drivers alternate in an arrangement direction of the light emitting elements, and the arrangement cycle decreases as the resolution increases.

* * * * *